UNITED STATES PATENT OFFICE.

FRIEDRICH KRECKE AND IGNAZ ROSENBERG, OF BIEBRICH, GERMANY, ASSIGNORS TO KALLE & CO., OF SAME PLACE.

DISAZO DYE.

SPECIFICATION forming part of Letters Patent No. 563,384, dated July 7, 1896.

Application filed December 30, 1895. Serial No. 573,814. (Specimens.) Patented in England January 9, 1894, No. 515.

*To all whom it may concern:*

Be it known that we, FRIEDRICH KRECKE and IGNAZ ROSENBERG, doctors of philosophy, residing at Biebrich-on-the-Rhine, Germany, have invented new and useful Improvements in the Manufacture of Azo Dyestuffs, (for which we have obtained Letters Patent in England, No. 515, dated January 9, 1894,) of which the following is a specification.

This invention relates to the manufacture of a new class of azo dyestuffs, which are prepared by combining one molecule of 1.8.4.6 amidonaphtholdisulfo-acid called "K" acid, with one molecule of a diazo body and acting on the so-formed intermediate azo compound in alkaline solution with another molecule of a diazo body. We have made application for said K acid on the 30th day of December, 1895, Serial No. 573,812.

In order to carry out our invention we proceed for instance as follows: Nineteen kilos of amidobenzylsulfo-acid are diazotized in the usual manner and added to a cold solution of thirty-four kilos acid sodium salt of 1.8.4.6 amidonaphtholdisulfo-acid and twenty-five kilos acetate of sodium in one thousand liters of water. After this mixture has been agitated for about twelve hours, it is rendered alkaline by addition of thirty-eight kilos caustic-soda lye of 40° Baumé and then the diazo solution, obtained by treating fourteen kilos of paranitranilin with twenty-five kilos hydrochloric acid of 20° Baumé and seven kilos of nitrite of soda, is stirred into it. The color formed in this manner is salted out, filtered, pressed, and dried. It represents a crystalline powder of reddish-bronze color, easily soluble in water, difficultly soluble in alcohol, and dyeing a dark greenish blue on wool from an acid-bath.

Instead of the diazobenzylsulfo-acid and the diazoparanitro-benzene employed in the example other diazo and diazo azo bodies can be used. If, for instance, the acid combination is made with paranitrodiazo-benzene and the alkaline combination with diazobenzylsulfo-acid or anilin or diazo azo benzene a similar result to that described in the example is obtained. If the alkaline combination of the same intermediate body is made with diazodiphenyl azo salicylic acid obtained by combining tetrazo-diphenyl with a molecular proportion of salicylic acid, a green substantive cotton color is obtained.

What we claim is—

1. As a new method of manufacture the preparation of disazo dyestuffs by combining one molecule of 1.8.4.6 amidonaphtholdisulfo-acid with one molecule of a diazo body in acid solution and acting upon the so-formed intermediate azo product with another molecule of a diazo body.

2. As a new method of manufacture, the preparation of diazo dyestuffs by combining one molecule of 1.8.4.6 amidonaphtholdisulfo-acid with one molecule of a diazo body in acid solution and acting upon the so-formed intermediate azo product with another molecule of a diazo azo body.

3. The new dyestuff herein described, which consists of a crystalline powder of reddish-bronze color, easily soluble in water, difficultly soluble in alcohol, and which dyes a dark greenish blue on wool in an acid-bath.

In testimony whereof we have signed our names to this specification in the presence of two subscribing witnesses.

FRIEDRICH KRECKE.
IGNAZ ROSENBERG.

Witnesses:
ROBERT DORFELDER,
CARL ED. HAHN.